May 4, 1954  R. W. PITMAN ET AL  2,677,301
HAND HELD LOW ALTITUDE BOMBSIGHT
Filed Feb. 14, 1951  4 Sheets-Sheet 1

FIG. 1

FIG. 4
TRIANGLES IN SPACE

FIG. 2
HORIZONTAL TRIANGLE

FIG. 3
VERTICAL TRIANGLE

INVENTORS
RICHARD W. PITMAN
FRANK W. SCHLESINGER
BY
ATTORNEY

May 4, 1954 R. W. PITMAN ET AL 2,677,301
HAND HELD LOW ALTITUDE BOMBSIGHT
Filed Feb. 14, 1951 4 Sheets-Sheet 3

INVENTORS
RICHARD W. PITMAN
FRANK W. SCHLESINGER
BY *G. D. O'Brien*
ATTORNEY

May 4, 1954  R. W. PITMAN ET AL  2,677,301
HAND HELD LOW ALTITUDE BOMBSIGHT
Filed Feb. 14, 1951  4 Sheets-Sheet 4

INVENTORS
RICHARD W. PITMAN
FRANK W. SCHLESINGER
BY
ATTORNEY

Patented May 4, 1954

2,677,301

UNITED STATES PATENT OFFICE 2,677,301

HAND HELD LOW ALTITUDE BOMBSIGHT

Richard W. Pitman, Philadelphia, Pa., and Frank W. Schlesinger, Chicago, Ill., assignors, by mesne assignments, to the United States of America as represented by the Secretary of the Navy Application February 14, 1951, Serial No. 210,968

10 Claims. (Cl. 88—1)

The present invention relates to bombsights and more particularly to a hand held bombsight for horizontal low altitude bombing especially adapted for antisubmarine combat.

One object of the present invention is to provide a portable hand held bombsight which may be used in any airplane, and will indicate the proper instant for release of bombs for effective attack against stationary, moving and/or submerged targets when information concerning altitude, ground speed, target aspect and other pertinent data have been properly registered on the instrument's controls.

Another object of this invention is to provide a portable bombsight which may be used to indicate accurately the optimum instant for release of the bombs even though the target, such as a submarine, submerges out of sight during the bombing run.

Still another object of the present invention is to provide a bombsight for stationary, moving, and/or submerged targets, which correlates three independent variables, airplane altitude and ground speed and the target aspect, to visually indicate the proper point for release of the bomb.

Still another object of the present invention is to provide a bombsight for stationary, moving, and/or submerged targets, which correlates the independent variables of airplane altitude and ground speed, a target aspect, and the characteristics of the bombs being used, to visually indicate the proper point for release of the bomb.

A still further object of the present invention is to provide an optical sighting system which presents an illuminated sighting image on a nonilluminated transparent sight plate, for facilitating proper sighting of targets under adverse light conditions.

Other objects will be apparent to those skilled in the art from the following detailed description of the present instrument made in conjunction with the accompanying drawings wherein.

*The general problems in bombing*

For accuracy in bombing various factors must be considered, among which are the ground speed of the airplane, its elevation, the speed of the target if moving, air resistance, and the bomb characteristics. For high precision bombing other factors such as wind velocity and wind direction also need be considered. But in the case of low altitude bombing these latter factors become negligible. The present bombsight, being designed particularly for low altitude bombing, is concerned, therefore, with the former factors and neglects the latter. In this section reference is had to the diagrammatic representations of Figs. 2, 3, and 4.

Figure 3:
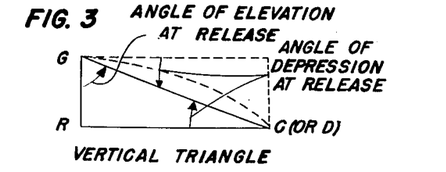

In the case of a stationary target, neglecting wind velocity and direction and reserving consideration of air resistance and bomb characteristics for a subsequent discussion, one need consider only the airplane's velocity and altitude and the constant acceleration of gravity. This situation is depicted in Fig. 3 wherein point G is the airplane, the line GR is the altitude of the airplane, and point C (or D) is the target. It is apparent that upon release of the bomb the velocity and direction of the airplane is imparted thereto forming one vector component of the bomb's flight, while the downward force of gravity forms the other vector component. The resultant thereof is the trajectory of the bomb, while the range from the airplane to the target is represented by the solid line GC. Consequently, as the target is approached, the bombardier must determine at what point the bomb must be released, considering the above factors, for a hit to result. The present apparatus is designed to compensate for these factors and to indicate accurately the proper time for release of the bombs after the airplane ground velocity and altitude adjustments are made on the apparatus.

Figures 1, 2, 4:
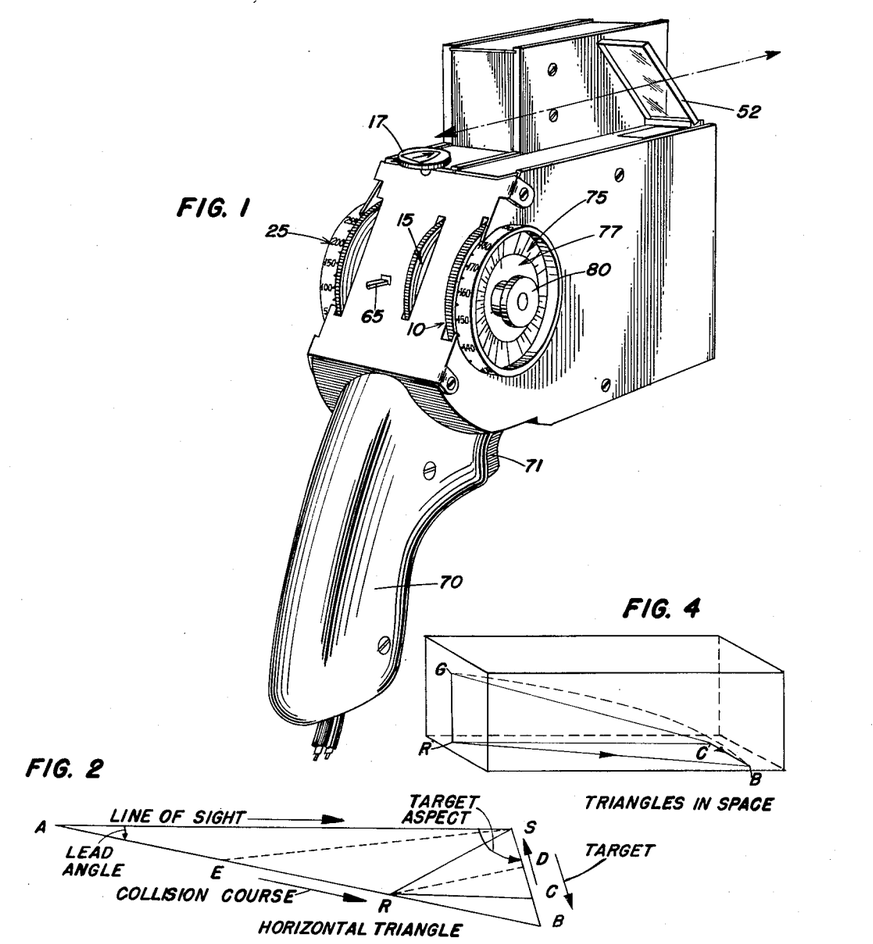
Fig. 1 is a perspective view of the bombsight.
Figs. 2, 3 and 4 are diagrams depicting the various factors involved in accurate bombing, compensated for by the present invention.

In the case of a moving target, the above factors must, of course, be considered, but in addition it becomes necessary to account for the direction and speed of the target. Neglecting the altitude and gravity components for the moment, reference to Fig. 2 illustrates the horizontal components. Line AB represents the direction of flight of the airplane while line SB represents the direction of movement of the target or the target aspect, angle ASB being the target aspect angle. When the plane is at some point R, before B, and is directed on a collision course with the target C, the bomb must be released, and following the course imparted to it by the course of the plane meets the target at B. Frequently, the only bearing that the bombardier may rely on is the target, and this is particularly true in antisubmarine warfare and marine bombing in general. Consequently, assuming a collision course, the bombardier must determine when to release the bomb from the range RC, the desired range being determined by the airplane altitude and ground velocity.

In actual practice, it is necessary to integrate all the factors above discussed to determine the proper point for release of the bomb. Fig. 4 is a three dimensional diagram combining the altitude diagram of Fig. 3, and a portion of the horizontal diagram of Fig. 2, to indicate the various factors involved in a bombing attack on a moving target. The bomb trajectory GC of Fig. 3 is, of course not applicable to this situation, but the trajectory here is indicated by the dotted line GB of Fig. 4. The variable components, the airplane altitude and ground velocity and the target aspect, the force of gravity being constant, are introduced into the bombsight and integrated therein, thereby enabling the bombardier to determine the proper point to release the bomb as indicated by the sight plate thereon.

Apparatus and operation

The above is a general description of the several variable factors involved in bombing; the following is a detailed description of the apparatus of the present invention functioning to integrate the above-described variables set into the bombsight and providing an indicating means for determining the proper point for releasing the bomb. For the purposes of the present section the bomb characteristic variable is omitted and reserved for a later discussion.

The ground speed of the plane is introduced into the instrument by means of the knurled ground speed dial 10 having an indicia bearing flange 11. Rotation of the ground speed dial to the desired setting is translated into the instrument by means of the ground speed pivot arm 12, rotation of said dial causing a corresponding rotation of gear 13 which in turn acts on rack 14 to raise or lower arm 12.

When the airplane is on a collision course with the target, the target aspect factor, see Fig. 2, is introduced by means of an independently and rotatably mounted, knurled target aspect angle dial 15, which setting is indicated by the position of the target aspect arrow 16 on disc 17, the dial 15 being linked to the disk 17 for corresponding rotation through gears 18 and 19 in a manner to be more fully described hereinafter. The thumb engaged dial 15 may be supported in the position shown in any manner found suitable for the purpose such, for example, as upon a bushing or other bearing structure which, if desired, may surround shaft 62b. The correct target aspect setting is obtained by sighting the target along the line of sight of the instrument, see Fig. 5, and turning knurled target aspect dial 15 until the target aspect arrow 16 points in the direction of the target course. The angle formed by the direction of the arrow with the line of sight is treated in the instrument as the target aspect angle, although in error from the true target aspect angle by the amount of the lead angle, see Fig. 2, which, however, is generally very small. The target aspect setting is translated into the instrument by means of azimuth slide rack 20, which is mounted on dial 15 for rotation therewith and is slideable thereon along elongated slots 21, said slidability being controlled by gear 22. For the present discussion, only the rotational movement of the rack is considered, the slideable movement being reserved for a later discussion. It will be understood that when target aspect dial 15 is manually rotated, azimuth slide rack 20 will be rotated therewith but will not slide in slots 21 because of a restraining spring to be again mentioned later. When rack 20 rotates with dial 15, gear 22 is rotated to thereby rotate shaft 62b, gears 18 and 19 and the target aspect arrow 16.

Figure 6:
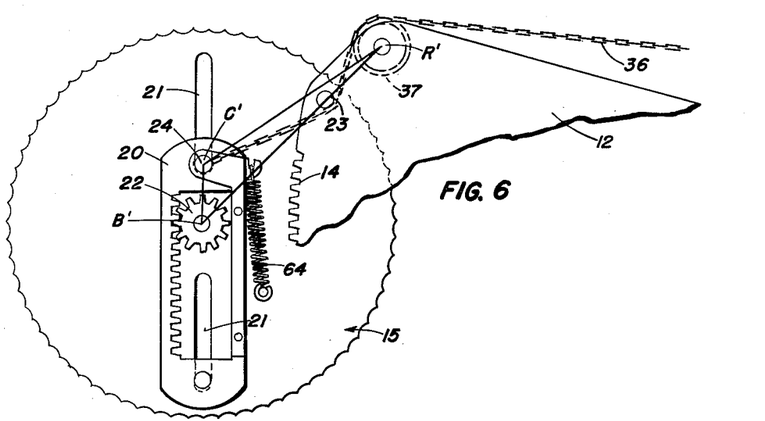
Fig. 6 is a detailed view of the portion of the instrument wherein the representative horizontal triangle of the bombing factors are set up.

The center of chain guide ratchet 37 on pivot arm 12, azimuth rack lug 24, and the center of azimuth gear 22 form the azimuth rate triangle R'C'B', shown in detail in Fig. 6, corresponding to the horizontal distance triangle RCB in Fig. 2, each side thereof being divided by the flight time from R to B to form the rate triangle. The side C'B' represents the distance CB traveled by a target having a predetermined ground speed divided by said flight time, side R'B' the distance RB divided by said flight time, or the ground speed of the airplane, and side C'R' the horizontal range between the airplane and the target divided by said flight time. Thus, the positioning of lug 24 so as to generate the angles B'C'R' and C'B'R' by the setting of pointer 16, in error by the lead angle, to define the angle B'R'C', makes the horizontal rate triangle R'C'B', this representative triangle depicting the ratios of the horizontal distance from the point of release of the bomb to the point of impact, to the distance from the target at the time of release of the bomb to the point of impact, to the horizontal range from the point of release of the bomb to the target at the time of release of the bomb as affected by the ground speed of the airplane and the course of the target, assuming the airplane is on a collision course with the target, and that the target is traveling at the predetermined speed for which the azimuth lug 24 is set.

As discussed in the previous section on the general problems of bombing, two triangles must be considered: the horizontal triangle considered above and the vertical triangle as defined by the airplane ground speed, its elevation, air resistance, and the force of gravity acting on the released bomb. In low altitude bombing the effect of wind velocity and direction on the trajectory of the falling bomb is negligible and may be ignored. Fig. 3 represents the vertical triangle, neglecting air resistance to be considered hereinbelow, letter G representing the airplane, line RG the altitude thereof, and letter C the target. As can readily be seen from the three dimensional representation of Fig. 4, when the target is traveling the course CB and the airplane the course RB, a bomb released at the range CG meets the target at B.

Figure 7:
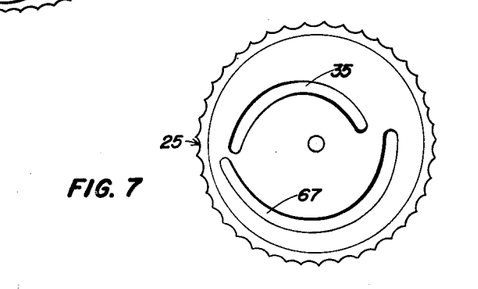
Fig. 7 is a face view of the operating surface of the altitude dial.

To form the vertical triangle necessary to complete the operation of the present bombsight, the altitude of the airplane is introduced through a knurled altitude dial 25 having an indicia bearing flange 26. This value is translated into the instrument by means of rocking arms 27 and 28 pivoting about rod 29 to slide leveling bulb 30, its frame 31 having fiducial line or level zero indicator 32, and its associated guide rod 33 reciprocably through bracket 100. The rotation of dial 25 is translated into the rocking motion of arms 27 and 28 by means of pin 34 on rocking arm 27 engaging slot 35, the contour of said slot, shown in Fig. 7, being designed to effectuate the desired movement of bulb 30 corresponding to the calibrations on altitude dial indicator 26.

The representative triangle C"R"G" corresponds to triangle CRG of Fig. 3. Thus, line G"R" is set into the representative triangle in accordance with the altitude of the airplane. The horizontal range distance CR of Figs. 2 and 4 is depicted in representative triangle C'R'B' as line C'R' where this range has been made a function of the airplane velocity. The range C'R' corresponds to C"R" in triangle C"R"G" because, as can be seen from Fig. 4, CR is common to both the vertical and horizontal triangles. The values impressed on C'R' are transmitted to the triangle C"R"G" by means of chain 36. Chain 36 is fixed at one end to rack lug 24, then passes around chain guide lug 23 on pivot arm 12 and around cog wheels 37, 38, 39 and 40 and is fixed at its other end to one tine of the bifurcated rod 41. Another chain 42 works against helical spring 43 attached at one end to chain 42 and at its other end to fixed lug 90. Chain 42 has one end fixed to ratchet or cog wheel 44 and is partially wound therearound. This ratchet wheel is fixed to ratchet wheel 45 for uniform rotation therewith about pivot 46. A third chain 47 is attached at one end to ratchet wheel 45 and is partially wound therearound and then passes over ratchet wheel 48 and is fixed at its other end to the other tine of bifurcated rod 41. Rod 41 is fixed to slide block 101, slidably mounted in slot 102, and has the bracket 100 pivotally mounted on one end thereof for slidably carrying the leveling bulb guide rod 33. Thus variations in C'R'—the horizontal range distance for the chosen airplane ground speed and horizontal triangle—are introduced into the vertical triangle C"R"G" by varying the angle of the leveling bulb 30 with respect to the vertical line G"R" representing the airplane altitude, thereby altering the angle of elevation of sight to the target C"G"R", corresponding to CGR in Fig. 3, and altering the length of the representative horizontal airplane-to-target distance line R"C".

Thus, by inserting into the present instrument the known data of the ground speed of the airplane, the altitude thereof, and the target aspect angle, and with the airplane on a collision course with the target as determined by the airplane pilot, the target may then be tracked with the bombsight and the exact point of release of the bomb for effecting a hit on the target is indicated by means of an optical system to be now described.

As described above, the leveling bulb or spirit level 30 is a correlating device properly uniting all the data inserted into the instrument to determine the angle of elevation or depression, these two angles being complementary, for sighting on the target when the range from the airplane to the target is proper for release of the bomb to effect a hit on the target under the conditions of flight then existing. An electric lamp 50 is positioned above the leveling bulb, and the light therefrom is directed toward and transmitted through said bulb 30 by a suitable reflector (not shown), reflected upwardly by right angle mirror 49 through collimating lens 51 to present an image of the bubble 53 at an infinite distance on transparent sight plate 52 when viewed along the line of sight indicated in Fig. 5. In addition, the frame 31 for the leveling bulb has a relatively narrow slit 32 therethrough functioning as a fiducial line for the leveling bubble 53. The light from lamp 50 is also transmitted through slit 32 and reflected by mirror 49 upwardly through lens 51 to appear on sight plate 52 at an infinite distance when viewed along said line of sight. Although sight plate 52 is transparent so as to enable the bombardier to observe the target therethrough, it is sufficiently polished to partially reflect the images of the bubble 53 and the level fiducial line 32 so as to permit simultaneous observation of these images and the target. Thus, the several variables introduced into the device are correlated by the leveling bulb 30 and the result thereof is depicted by the bubble image on sight plate 52, to indicate the desired angle of depression of sight under the existing conditions of flight.

The optical system hereinabove described, comprising what is essentially a compound lens composed of the leveling bulb fluid and the bubble therein together with the collimating lens 51, would present a nonilluminated bubble image in an illuminated surrounding on the sight plate. This situation presents the obvious disadvantage of hindering target observation through the sight plate, particularly when target illumination is poor. However, by the provision of the diaphragm of light shielding strip 30a between the bulb 50 and the level 30, which is made sufficiently wider than the image of the level and bubble formed by lens 51 on the sight plate, the image situation is reversed, the system yielding an illuminated bubble image in a nonilluminated surrounding on the sight plate, thus enhancing the observation of a target through the sight plate. The fiducial line appears at all times as an illuminated image. Since the results here obtained are readily understandable by one skilled in the art, no detailed analysis of light travel through the present system is here made, since it can be readily had by those skilled in the art from the physical description of the system. It is desired to indicate, however, that the focal length of the lens 51 is equal to the length of the optical path from the upper surface of the leveling bulb 30 to said lens, and that the leveling bulb 30 is formed with a lengthwise radius of curvature of its upper surface equal to the focal length of the lens 51, in order that the image of the bubble not be displaced in its optical distance from said lens when the entire instrument is tilted to various angles with horizontal, which is done during actual use of the bombsight as will be subsequently described.

In operation, therefore, when a collision course with the target has been determined and the attack run has begun, the airplane ground speed and altitude are introduced into the instrument by means of the knurled dials 10 and 25 respectively, and the target aspect angle is inserted into the instrument by sighting on the target through the sight plate 52 and adjusting the target aspect dial 15 until arrow 16 points in the direction parallel to the target's course. The instrument is now set for tracking the target. This is accomplished by holding the instrument at such an angle as to bring the leveling bubble into coincidence with the fiducial line 32 as observed by their images on the sight plate 52. With the data thus inserted in the bombsight, it is apparent that registry of bubble 53 with fiducial line 32, whose angular position is determined by relative settings of ground speed, target aspect, and altitude, indicates that angle of depression of the line of sight to the target which is had when the airplane is at the proper bomb release point for obtaining a hit on the target, while the altitude determines the linear displacement of said image on the sight plate. Therefore, if the observer positions his eye on the line of sight, he may both maintain the instrument at the proper angle of depression as indicated by the leveling bubble and fiducial marker images on the sight plate and simultaneously track the target through said sight plate.

Figure 10:
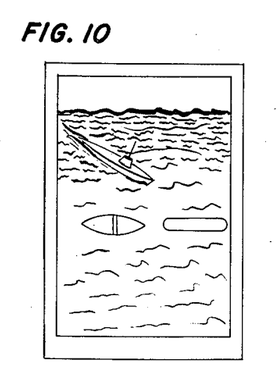
Figs. 10 and 11 are views of the sight plate during a bombing run on a surface target.
Figure 11:
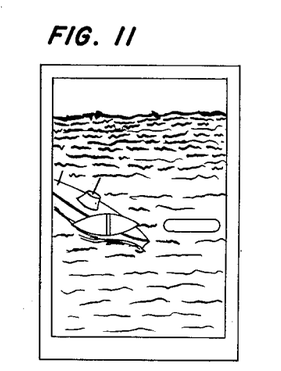

The position of the registered leveling bubble image on the sight plate 42 is determined by the altitude setting inserted into the instrument, while the proper angle of depression for the line of sight to the target is determined by the ground speed and target aspect settings inserted into the instrument. As the plane approaches the point R where the bomb should be released, the registered bubble image approaches coincidence with the target as sighted through the sight plate, as shown in Fig. 10, the approach, and Fig. 11, on target. If the leveling bubble is maintained coincident with the fiducial line 32 during the approach run, the bubble image comes into coincidence with the target when the plane, flying the collision course established, reaches the proper range from the target as described above in the section "General Problems of Bombing." By this device the bombardier can thereby determine the proper instant to release the bombs.

In the event that the target is stationary, the operation of the device is identical to that described for a moving target, except there being no target aspect angle, the target aspect arrow would point in a direction transverse to the line of sight through the sight plate 52, thereby eliminating the assumed target speed with respect to line of flight of the airplane, as set in by the adjustable distance from lug 24 to the center of pinion 22 and as depicted by the representative line C'B', and the target is tracked in the same manner as described above.

Any of the above-described settings made on the present bombsight may be changed at any time that the conditions of flight or target course so alter as to make such changes necessary. For example, if the target should change course during the attack run, the pilot must alter the airplane heading to maintain a collision course, whereupon the bombardier must reset the target aspect angle accordingly. Or if the airplane altitude and/or ground speed should be altered, commensurate changes in the respective settings must be made.

As mentioned above, the target speed is set into the instrument by leg B'C' of the representative horizontal triangle. As described hereinbefore, this distance has remained fixed and therefore effective only as against moving targets traveling at the rate represented thereby. However, as will be readily apparent to those skilled in the art, any conventional means may be employed to alter the length of B'C' proportional to the speed of the target, thereby making the present bombsight effective and accurate against moving targets over a range of target speeds. Merely by way of example, one such means for altering the length of B'C' is to include a rate control in the timer 60 for adjusting the latter to operate in a manner proportional to the speed of the target and thereby impart such operation through mechanism described hereinafter to gear 22 to alter the length of leg B'C'.

*Submerged target*

The present invention also includes means for determining the proper point to release a bomb when a target such as a submarine submerges during the attack run. After the bombsight is set for a bombing run on a chosen target and the attack run has begun, in the case of a submarine target the submarine may submerge to elude the attack. The present bombsight is so constructed as to provide for accurate bombing in such an event by using the temporary swirl and oil slick left by the submarine when it submerges as the reference point upon which the bombsight is trained.

The functioning of this apparatus in this regard is based on the assumption that the submarine continues its course after submergence and that the pilot can properly alter his heading to maintain a collision course therewith, and on the further assumption that the submarine travels at a known and predetermined rate when submerged. On the above-mentioned assumptions, a timing mechanism is contained in the bombsight as a part of the present invention which, when desired, can be used to extend the rate leg B'C' of representative triangle C'B'R', and in this way a correction factor is introduced into the angular position of the leveling bulb enabling the bombardier to train the sight on the temporary swirl or oil slick left by the submerged craft and have the proper range for release of the bomb referred thereto in the manner described above, the movement of the target being compensated for within the instrument.

Referring to the horizontal analysis of Fig. 2, the airplane is flying the attack collision course AB and a submarine is taking the course SB, but in this instance the submarine submerges at S after the above-described settings for the surfaced target have been inserted into the instrument. The bombardier uses the instrument as described above but keeps the sight trained on the point of submergence S revealed by the oil slick or swirl left by the submerged target, as indicated by the dotted line ES, while the pilot must alter his course in order to maintain a collision course with the target. In this example it is assumed that the underwater speed of the submarine is the same as its surface speed and that its underwater course is the same as its surface course, although the principles of operation involved are the same, in the present example the pilot does not alter his heading nor need any changes be made in the bombsight. Immediately on submergence of the target, then, the bombardier starts the timing mechanism which extends the rate leg B'C' to compensate for the travel of the submarine while he keeps the bombsight trained on the surface swirl or oil slick left by the submarine. If the timing mechanism operates in proportion to the underwater speed of the target, proper compensation is introduced in the position of the leveling bulb 30 so that the proper moment for release of the bomb is indicated by coincidence of the bubble image with the surface swirl or oil slick on the sight plate 52, the proper range being depicted in Fig. 2 as line RS.

As described above for a surfaced target, R is the proper point for release of the bomb as indicated by the range RC. But if the target submerges at S, the range RC cannot be observed or determined, for there is no reference to indicate point C. However, if the underwater speed of the target is assumed to be known and an imaginary point D is caused to travel from C to S at the assumed rate at which the target travels from S to C, then point D reaches S at the time that the target reaches C and the airplane reaches R, the proper point for release of the bomb. Therefore, if the travel of the imaginary point D is inserted in the bombsight by causing the representative line B'C' to be extended at a rate proportional to the assumed rate of travel of the submerged target, the necessary correction is introduced into the angular position of the leveling bulb in order that the range for release of the bomb may be referred to the swirl or oil slick left at S, the point of submergence, and the travel of the target is thus compensated. To this end the above-mentioned timing mechanism operates to so extend the representative line B'C' by moving the azimuth lug 24 as described in detail below. Thus, upon submergence of the target the pilot alters his heading if necessary to maintain a collision course therewith, while the bombardier alters the target aspect angle if necessary, initiates the timing mechanism of the bombsight, and then keeps the sight trained on the swirl or oil slick left by the target at the point of submergence, otherwise using the instrument as described above for a surfaced target. The proper point for release of the bomb is indicated by coincidence of the leveled leveling bulb's bubble image with the point of submergence.

The compensating device comprises a timing motor 60 preferably of a spring windup type, although any other suitable type of motor may be employed, gear 61 connected to one end of shaft 62a and pinion gear 22 connected to one end of shaft 62b and cooperating with azimuth rack 20. Shaft 62a is connected to shaft 62b through coupling 105, said coupling being so constructed as to enable the shaft 62a and its associated gear 61 to be moved into and out of engagement with the timer 60 along the axial line of the shaft without a corresponding movement of the shaft 62b and its associated pinion gear 22. In the tracking of a surface object the gear 61 is disengaged from timer 60 to enable free rotation of the target aspect dial 15 and permitting the rack 20 to be held in zero position by spring 64 as shown in Fig. 6. To effectuate the timing compensation, the gear 61 is brought into engagement with timer 60 by any suitable means operated by lever 65, the movement also functioning to start the timer which is normally off. Operation of the timer 60 causes the pinion gear 22 to rotate at a predetermined rate without effecting rotation of thumb engaged dial 15 thus moving the rack 20 in slot 21 at a predetermined rate, proportional to the target speed and effectuating the desired compensation by extending the line B'C' at the desired rate. As mentioned above, the timer is preset for a given underwater target velocity, but if desired, a rate control may be included in the timer for adjusting the same to various underwater target speeds.

The above description explains the operation of the present invention for bombing submerged targets when only the horizontal factors are considered. But it is apparent that the rate of change of the range RD as represented by R'C' is a function of the altitude of the airplane. It, therefore, is necessary that the rate of extension of representative line B'C' be made an equivalent function of the altitude. To this end the timer is provided with a timer cam stud 66 operated by cam slot 67, see Fig. 7, in the altitude dial 25. This stud and slot operate upon the timer to adjust its rate of operation in accordance with the altitude set into the device by the altitude dial, thereby controlling the rate of movement of azimuth rack 20 and the rate of extension of representative line B'C', making the same a proper function of the airplane altitude.

The changes in line B'C' as effected by movement of rack 20 and its lug 24 are translated into a corresponding alteration of the angular position of leveling bulb 30 by means of connecting chain 36, and thereby cause commensurate changes in the proper angle of depression of the line of sight as indicated through the optical system described above.

The use of this device against submerged targets is intended to be applied only against such targets which have submerged after the attack run and the tracking of the target have been started while the target is surfaced. If during this attack the target submerges, the operation of the device is altered from the procedure discussed above for a surfaced target by immediately on submergence altering the target aspect setting if necessary and moving lever 65 to operate timer 60 and to bring gear 61 and timer 60 into engagement, thereby putting the desired automatic compensation into representative triangle B'C'R' and thus into the angular position of leveling bulb 30. With this compensation thus introduced into the instrument for the assumed underwater speed of the target the bombardier then proceeds as described above under the discussion of surfaced target operation, except the sight plate is trained on the temporary swirl or oil slick at the point of submergence, and the bomb is released when the bubble image on the sight plate coincides with the oil slick or swirl, which operation is fully described above.

As in the case of a surfaced target, the altitude and ground speed settings may be varied when necessary, but once the timer has been started the target aspect setting should not be altered.

*Other features*

The present bombsight works in conjunction with a suitable electric control box receiving its current supply preferably from the airplane supply. This control box supplies the current for lamp 50 and has a suitable rheostat for controlling the brilliance of the light as desired by the bombardier for obtaining the optimum leveling bubble image.

In addition, the bomb release mechanism of the airplane is operated through said control box. The pistol grip handle 70 of the bombsight has a trigger 71 operating as the ultimate bomb release control. Before or during the attack the control box is set to operate the airplane's bomb release mechanism, but the activation of this control circuit is ultimately controlled by a switch in the handle 70 of the bombsight operated by the trigger 71. Thus, with the control box properly set, at the desired moment as indicated by the bombsight the bombardier presses trigger 71 thereby releasing the bomb, or a stick comprising a plurality of bombs.

When a stick or plurality of bombs is dropped, the pattern and position thereof which they form on reaching the ground is dependent on their relative positions in the stick of bombs before being dropped, the altitude of the airplane when dropped, and the air resistance and wind currents. The wind current is a negligible consideration in low altitude bombing and is ignored in the use of the present instrument. However, the other factors are not negligible and are compensated for in the present instrument so that the center of the ground pattern formed by the bombs corresponds to the center of the target when dropped at the proper range as determined by the instrument as aforedescribed.

Figure 5:
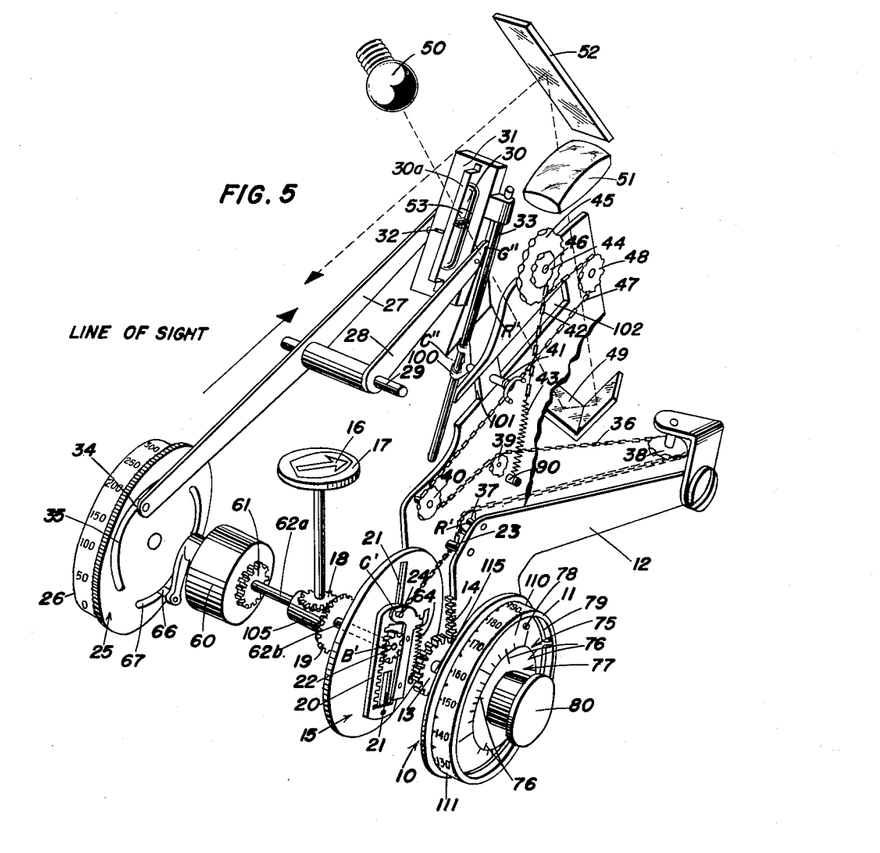
Fig. 5 is a perspective view of the compensating apparatus of the bombsight, the casing being removed, and a partition wall partially cut away to reveal the entire apparatus.
Figure 9:
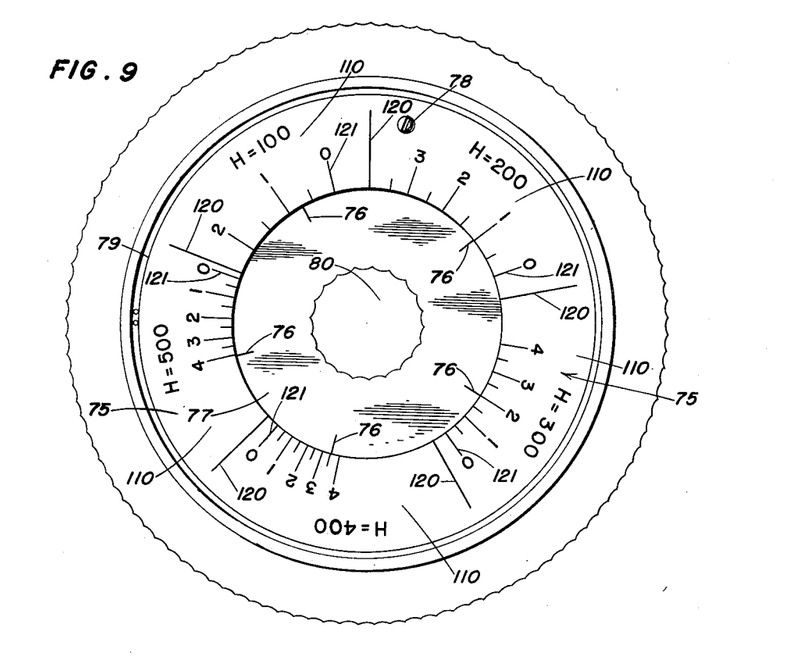
Fig. 9 is a detailed face view of the ground speed and bomb characteristic dial.

The foregoing description of the present instrument considered the factors of bombing for an ideal or in vacuo trajectory of a single bomb. The present description considers the compensations necessary to correct for the trail of the bomb due to air resistance, for the situation where a stick of bombs is used to bring the center of the ground pattern formed thereby on the target, and, in the case of a submerged target, for the underwater travel of a bomb if a depth bomb is employed rather than an impact bomb. To accomplish these compensations, a plate 75, see Figs. 5 and 9, is calibrated to compensate, when properly set, for the characteristics of the bomb stick used, the calibration being divided into fields of various altitudes, preferably for every 100 feet of altitude, and each altitude field is calibrated for various stick lengths, i. e. the length from one end to the other of the plurality of bombs comprising the stick, for the trail at each altitude field, and for the underwater travel of the bomb. A number of differently calibrated plates are employed, each plate 75 being calibrated in accordance with the appropriate characteristics of a particular type of bomb. The adjustment is then made by registering the proper reference line 76 of dial 77 with the proper calibration in the particular altitude field 119 of the calibrations in which the attack run is being made.

Figure 8:
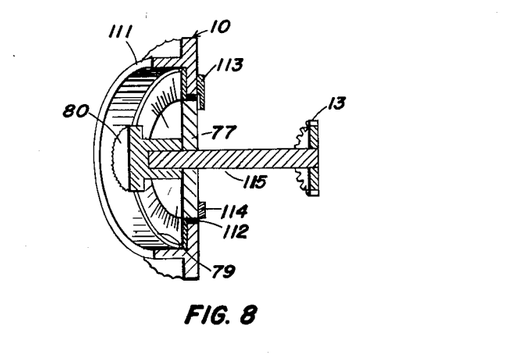
Fig. 8 is a cross-sectional view of the ground speed and bomb characteristic dial.

It is apparent that to lay the stick of bombs symmetrically across the target, the first bomb must be released at a point one half the stick length farther back along the line of flight than would be determined for a single bomb. The underwater travel of the bomb in the case of a depth bomb is accounted for by an additional backward displacement along the line of flight dependent upon the particular bomb characteristics. The small amount of trail is compensated for by a forward displacement along the line of flight and is also dependent upon the particular bomb characteristics. These various factors, then, may be added algebraically and imposed on the setting of the bombsight by introducing the proportionate correction in the line B'R', representing the line of flight of the airplane. To this end, the ground speed dial 10 is provided with an inner differential dial 77 shown in cross section in Fig. 8. The dials 10 and 77 are independently rotatable through the annular friction bearing 112, while the relative rotation therebetween is limited to the extent of the various altitude fields by engagement of lugs 114, integral with dial 77, with stops 113, integral with dial 10, these lugs and stops being so positioned on their respective dials as to confine the relative movement therebetween to the extent of the various altitude fields. Thus, the desired compensation, as indicated by the calibrations on plates 75, may be introduced into the instrument by holding the dial 10 stationary while adjusting the dial 77, this adjustment being transmitted to the arm 12 and hence to the leveling bulb 30 by means of shaft 115 and pinion gear 13 to the rack 14 on arm 12 in the same manner as the ground speed setting is inserted into the instrument. With the proper setting of dial 77 relative to dial 10, dial 10 may then be moved to introduce the proper ground speed, dial 77 then being left free to rotate with dial 10 as controlled by the friction bearing 112.

Fig. 9 is a detailed face view of the ground speed and the bomb characteristic dials. The lines 120 denote the limits of each altitude field and hence the limit of movement of each reference line 76, each such line being confined to its field by the limit stops 113 and their associated lugs 114 described above. The calibrations 121 denote zero stick length or represent the setting for a single bomb when it is desired to compensate for trail caused by air resistance and underwater travel of the bomb. The other calibrations denote the various stick lengths in feet as indicated. The distance between the extreme clockwise limit and the zero stick length setting for each altitude field is the correction for the trail and the underwater travel of the bombs algebraically combined. Separate corrections for these two latter factors may, of course be indicated on the dial, or only one factor may be compensated for if desired.

The appropriate calibrated plate 75 is used for the particular characteristics of the type of bomb being used, this being accomplished by having interchangeable plates 75 calibrated in accordance with the various types of bombs. The appropriate plate 75 is inserted on the velocity dial 10 and properly placed by registering positioning screw 78 with an opening therefor in plate 75. The plate is held in position by means of a snap spring or the like 79. Thus by removal of spring 79 the desired plate 75 may be properly inserted in the velocity dial 10 and the snap spring applied thereto to hold the plate in position. The reference line 76 for the appropriate altitude field is then positioned by means of knob 80 to correspond with the desired calibration on plate 75. Rotation of knob 80 effects a rotation of gear 13 independent of dial 10 when dial 10 is held stationary, and thus through arm 12 introduces the desired correction into the representative horizontal triangle B'C'R'.

*Conclusion*

It is therefore apparent from the foregoing description that the present device comprises a means for determining the range from a target at which a bomb should be dropped and for indicating when that range is reached. This is accomplished by a mechanism included in the bombsight for correlating the target aspect angle, the ground speed of the airplane, the altitude of the airplane, and various characteristics of the bomb or stick of bombs being dropped. The correlation is expressed by an angular and linear displacement of an indicator observed on the sight plate, so that when the sight line is held at the indicated angle of depression the indicator appears at various vertical displacements on the sight plate, thereby expressing the resultant range as a combination of the above data. The bomb release point is determined by coincidence of the indicator with the target as viewed through the sight plate. In addition, an automatic compensator is included in the instrument for continued tracking of a submarine after submergence thereof by using the temporary swirl or oil slick as the reference point for the bombsight and thereby determining the proper point for release of the bomb. It will be understood that although in the embodiment of the invention disclosed herein the movement of the bulb 30 is angular and curvilinear such movement is intended to be embraced by the term "linear" as used in the appended claims.

The above detailed description of one embodiment of the present invention is presented merely by way of example, and the scope of the invention is not limited thereto. Modifications within the spirit and scope of the present invention as defined by the appended claims will be apparent to those skilled in the art, and are therefore within the contemplation of the present patent.

What is claimed is:

1. In a low altitude bombsight for airplanes, a target aspect dial for inserting the target course into said bombsight, a target aspect indicator for denoting said course, a ground speed dial for inserting the ground speed of said airplane, a pivot arm adjustable by said ground speed dial, an azimuth rack slidably mounted on said target aspect dial and rotatable therewith, an azimuth pinion cooperating with said rack, a zeroing spring for urging said rack into zero position on said target aspect dial, a lug mounted on said rack, a chain guide mounted on said pivot arm for movement therewith; an altitude dial, a correlating leveling bulb having a leveling bubble therein, a rod supporting said bulb, a rocking arm pivotally carrying said bulb at one end and engaging said altitude dial at its other end causing said bulb and rod to move in accordance with the altitude settings, a slidably mounted block, a bracket pivotally mounted on said block slidably engaging said rod and varying the angular position of said bulb in accordance with the block and rocking arm positions; a chain fastened at one end to said lug, engaging said chain guide, and fastened at its other end to said block, resilient means urging said block to pull on said chain; adjustments of said target aspect and said ground speed dials thereby rotating said leveling bulb through sliding movement of said block, adjustments of said altitude dial moving said bulb along the arc described by said rocking arm; a sight plate, an optical means for transmitting an image of said bubble to said sight plate, the position of said image thereon being controlled by said altitude dial settings as translated by the arcuate movement of said leveling bulb, a fiducial level marker carried by said leveling bulb, an image thereof being transmitted to said sight plate to indicate leveling of said bulb and zeroing of said reference bubble image thereby indicating the angle of depression of said bombsight, said bubble image thereby forming a reference index to indicate proper range for release of the bombs; a bomb characteristic compensator comprising a dial, adjustment thereof altering the position of said pivot arm independently of said ground speed dial and thereby imparting a bomb characteristic compensation to said leveling bulb position; and a submerging target compensator comprising a timer, a means for controlling the speed of the timer responsive to the altitude dial setting, said timer rotating said azimuth pinion thereby sliding said azimuth rack on said target aspect dial to vary the position of said lug in accordance with the underwater travel of the target, thereby effecting a compensating movement of said leveling bulb, said submergence compensator thereby enabling a range determination on said submerged target by reference through said sight plate to the point of submergence.

2. In a low altitude bombsight for airplanes, a target aspect dial for inserting the target course into said bombsight, a target aspect indicator for denoting said course, a ground speed dial for inserting the ground speed of said airplane, a pivot arm adjustable by said ground speed dial, an azimuth lug mounted on said target aspect dial for rotation therewith, a chain guide mounted on said pivot arm for movement therewith; an altitude dial, a correlating leveling bulb having a leveling bubble therein, a rocking arm connecting said bulb and said altitude dial causing said bulb to move in accordance with the altitude settings, a slidably mounted block, a bracket pivotally mounted on said block for varying the angular position of said bulb in accordance with the block and rocking arm positions; a chain fastened at one end to said azimuth lug, engaged by said chain guide, and fastened at its other end to said block, resilient means urging said block to pull on said chain; adjustments of said target aspect and said ground speed dials thereby rotating said leveling bulb through sliding movement of said block, adjustments of said altitude dial moving said bulb along the arc described by said rocking arm; a sight plate, an optical means for transmitting an image of said bubble to said sight plate, the position of said image being controlled by said altitude dial settings as translated by the arcuate movement of said leveling bulb, a fiducial level marker carried by said leveling bulb, an image thereof being transmitted to said sight plate to indicate leveling of said bulb and zeroing of said reference bubble image thereby indicating the angle of depression of said bombsight, said bubble image thereby forming a reference index to indicate proper range for release of the bombs; and a bomb characteristic compensator dial, adjustment thereof altering the position of said pivot arm independently of said ground speed dial and thereby imparting a bomb characteristic compensation to said leveling bulb position.

3. In a low altitude bombsight for airplanes, a target aspect dial for inserting the target course into said bombsight, a target aspect indicator for denoting said course, a ground speed dial for inserting the ground speed of said airplane, a pivot arm adjustable by said ground speed dial, an azimuth lug mounted on said target aspect dial for rotation therewith, a chain guide mounted on said pivot arm for movement therewith; an altitude dial, a correlating leveling bulb having a leveling bubble therein, a rocking arm connecting said bulb and said altitude dial causing said bulb to move in accordance with the altitude settings, a slidably mounted block, a bracket pivotally mounted on said block for varying the angular position of said bulb in accordance with the block and rocking arm positions; a chain fastened at one end to said azimuth lug, engaged by said chain guide, and fastened at its other end to said block, resilient means urging said block to pull on said chain; adjustments of said target aspect and said ground speed dials thereby rotating said leveling bulb through sliding movement of said block, adjustments of said altitude dial moving said bulb along the arc described by said rocking arm; a sight plate, an optical means for transmitting an image of said bubble to said sight plate, the position of said image being controlled by said altitude dial settings as translated by the arcuate movement of said leveling bulb, and a fiducial level marker carried by said leveling bulb, an image thereof being transmitted to said sight plate to indicate leveling of said bulb and zeroing of said reference bubble image thereby indicating the angle of depression of said bombsight, said bubble image thereby forming a reference index to indicate proper range for release of the bombs.

4. In a low altitude bombsight for airplanes, a target aspect dial for inserting the target course into said bombsight, a ground speed dial for inserting the ground speed of said airplane, a pivot arm adjustable by said ground speed dial, a target aspect lug movable with said target aspect dial, a ground speed lug mounted on said pivot arm for movement therewith; an altitude dial, a correlating leveling bulb having a leveling bubble therein, means for moving said bulb along one line in accordance with the altitude dial settings, a slidably mounted block cooperating with said bulb to vary its angular positions in accordance with the block and rocking arm positions, azimuth translating means for positioning said block in accordance with the movement of the target aspect and ground speed lugs as determined by the target aspect and ground speed settings respectively, a sight plate, an optical means for transmitting an image of said bubble to said sight plate, the position of said image being controlled by the altitude settings as translated by the movement of said leveling bulb, means for indicating the leveling of said bulb and zeroing said bubble image thereby indicating the angle of depression of said bombsight, said image thereby forming a reference index to indicate proper range for release of the bombs, and a submerging target compensator comprising a timer, a means for controlling the speed of the time responsive to the altitude dial setting, said timer moving said target aspect lug at a predetermined rate corresponding to the rate of travel of said submerged target, thereby effecting a movement of said leveling bulb compensating for the underwater travel thereof, said submergence compensator thereby enabling a range determination on said submerged target by reference through said sight plate to the point of submergence.

5. In a low altitude bombsight for airplanes, means for inserting the target course into said bombsight, means for inserting the ground speed of said airplane therein, means for inserting the altitude of the airplane therein, a correlating leveling bulb mounted for linear and angular movement, an azimuth translating means responsive to the target course and airplane ground speed inserting means, means cooperating with said azimuth translating means for varying the angular position of said bulb in accordance with the target course and ground speed, and altitude translating means for linearly moving said bulb in response to the altitude inserting means, a sight plate, means for transmitting an image of said bulb to said sight plate, the position of said image being controlled by said altitude as translated by the linear movement of said leveling bulb, a fiducial level marker carried by said leveling bulb, an image thereof being transmitted to said sight plate to indicate leveling of said bulb and zeroing of said bubble thereby indicating the angle of depression of said bombsight, said bubble image thereby forming a reference index to indicate proper range for release of the bombs, and a submerging target compensator comprising means for altering said azimuth controlled setting of the bulb at a predetermined rate corresponding to the rate of travel of said submerged target, thereby compensating for the underwater travel of said target and enabling a range determination on said submerged target by reference through said sight plate to the point of submergence.

6. In a low altitude bombsight for airplanes, means for inserting the target course into said bombsight, means for inserting the ground speed of said airplane therein, means for inserting the altitude of the airplane therein, means for correlating said inserted data, azimuth translating means for rotating said correlating means in response to the target course and airplane ground speed inserting means, an altitude translating means for linearly moving said correlating means in response to the altitude inserting means, a sight means, means cooperating with said correlating means and said sight means indicating a bomb release reference point on said sight means, said reference point moving linearly on said sight means in accordance with the linear movement of said correlating means, said reference point further indicating the angle of depression of said bombsight in accordance with the angular position of said correlating means; and a submerging target compensator comprising means for automatically moving said correlating means angularly in accordance with the movement of the submerged target, thus effecting a compensating movement of said correlating means for the underwater movement of the target, said submergence compensator thereby enabling a range determination on said submerged target by reference through said sight means to the point of submergence of said target.

7. In a bombsight for airplanes comprising a target aspect dial for inserting the target course into the bombsight, a ground speed dial for inserting into the bombsight the ground speed of the airplane, an altitude dial for inserting the altitude of the airplane into the bombsight, means for correlating the data thus inserted, azimuth translating means for rotating said correlating means in response to the target aspect and airplane ground speed dials, altitude translating means for linearly moving said correlating means in response to the altitude dial, and a bomb release indicating means responsive to the correlating means for indicating the proper point for release of the bombs; a bomb characteristic compensator and a target submergence compensator, said bomb characteristic compensator comprising a characteristic calibrated dial and an indicator knob, rotation of said knob to the proper point on said characteristic dial compensating said correlating means for the characteristics of the bomb used by affecting the azimuth translating means to alter the azimuth setting of said correlating means in accordance with the appropriate characteristics of the bomb, and said target submergence compensator comprising a timer, a speed control therefor responsive to the altitude dial setting, and means cooperating with said timer to alter said correlating means setting at a rate in accordance with the rate of travel of said submerged target through said azimuth translating means, thereby compensating said correlating means for the underwater movement of the target and thereby enabling the bombsight to be referenced to the point of submergence of said target.

8. In a low altitude bombsight for airplanes comprising means for inserting the target course into the bombsight, means for inserting therein the ground speed of the airplane, means for inserting therein the altitude of the airplane, means for correlating the data thus inserted, and a bomb release indicating means responsive to the correlation for determining the proper point for release of the bombs; a bomb characteristic compensator and a target submergence compensator, said bomb characteristic compensator comprising a bomb characteristic calibrated dial and an indicator knob, rotation of said knob to the proper point on said characteristic dial compensating said correlating means for the characteristics of the bomb used, and said target submergence compensator comprising a timer, a speed control therefor responsive to said altitude inserting means, and means cooperating with said timer to alter said correlating means at a rate in accordance with the rate of travel of said submerged target, thereby compensating said correlating means for the underwater movement of the target and thereby enabling the bombsight to be referenced to the point of submergence of said target.

9. A bombsight comprising means for inserting the target course into the bombsight, means for inserting therein the ground speed of the airplane, means for inserting therein the altitude of the airplane, means for correlating the data thus inserted, and a bomb release indicating means responsive to the correlation for determining the proper point for release of the bombs; a target submergence compensator comprising a timer, a speed control therefor responsive to said altitude inserting means, and means cooperating with said timer to alter said correlating means at a rate in accordance with the rate of travel of said submerged target, thereby compensating said correlating means for the underwater movement of the target and thereby enabling the bombsight to be referenced to the point of submergence of said target.

10. In a low altitude bombsight for airplanes, a target aspect dial for inserting the target course into said bombsight, a target aspect indicator for denoting said course, a ground speed dial for inserting the ground speed of said airplane, a pivot arm adjustable by said ground speed dial, an azimuth rack slidably mounted on said target aspect dial and rotatable therewith, an azimuth pinion cooperating with said rack, a zeroing spring for urging said rack into zero position on said target aspect dial, a lug mounted on said rack, a chain guide mounted on said pivot arm for movement therewith; an altitude dial, a correlating leveling bulb having a leveling bubble therein, a rod supporting said bulb, a rocking arm pivotally carrying said bulb at one end and engaging said altitude dial at its other end causing said bulb and rod to move in accordance with the altitude settings, a slidably mounted block, a bracket pivotally mounted on said block slidably engaging said rod and varying the angular position of said bulb in accordance with the block and rocking arm positions; a chain fastened at one end to said lug, engaging said chain guide, and fastened at its other end to said block, resilient means urging said block to pull on said chain; adjustments of said target aspect and said ground speed dials thereby rotating said leveling bulb through sliding movement of said altitude dial moving said bulb along the arc described by said rocking arm; an optical means for transmitting an image of said bubble and including a light source, said leveling bulb and associated leveling bubble and a fiducial level marker, a light shielding strip interposed between said light source and said bulb for shielding a portion of said bulb from said light source, a collimating lens positioned in the optical path of light transmitted through said leveling bulb for transmitting an image of the bubble and said level marker, and a sight plate positioned in the optical path of said transmitted image enabling a correlation of the image position on said plate with an object sighted therethrough, said light shielding strip providing an illuminated image of the bubble and level marker in a nonilluminated surrounding on said plate, the position of the image on said sight plate being controlled by said altitude dial settings as translated by the arcuate movement of said leveling bulb, the image of said level marker indicating the leveling of said bulb and zeroing of said bubble image thereby indicating the angle of depression of said bombsight, said bubble image thereby forming a reference index to indicate proper range for release of the bombs; a bomb characteristic compensator comprising a dial, adjustment thereof altering the position of said pivot arm independently of said ground speed dial and thereby imparting a bomb characteristic compensation to said leveling bulb position; and a submerged target compensator comprising a timer, a means for controlling the speed of the timer responsive to the altitude dial setting, said timer rotating said azimuth pinion thereby sliding said azimuth rack on said target aspect dial to vary the position of said lug in accordance with the underwater travel of the target, thereby effecting a compensating movement of said leveling bulb, said submergence compensator thereby enabling a range determination on said submerged target by reference through said sight plate to the point of submergence.

References Cited in the file of this patent

UNITED STATES PATENTS

| Number | Name | Date |
| --- | --- | --- |
| 1,705,146 | Wilson | Mar. 12, 1929 |
| 2,173,142 | Thurlow et al. | Sept. 19, 1939 |
| 2,383,952 | Bates | Sept. 4, 1945 |
| 2,404,746 | Rylsky et al. | July 23, 1946 |
| 2,410,667 | Luboshez | Nov. 5, 1946 |
| 2,412,585 | Klemperer et al. | Dec. 17, 1946 |
| 2,431,919 | Clark | Dec. 2, 1947 |
| 2,459,919 | Clark | Jan. 25, 1949 |
| 2,477,050 | Dyson | July 26, 1949 |
| 2,529,324 | Blackett et al. | Nov. 7, 1950 |

FOREIGN PATENTS

| Number | Country | Date |
| --- | --- | --- |
| 130,048 | Great Britain | July 31, 1919 |